United States Patent [19]
Tsai

[11] Patent Number: 6,005,685
[45] Date of Patent: Dec. 21, 1999

[54] TRANSMISSION MECHANISM FOR A CONTACT-TYPE IMAGE SCANNER

[75] Inventor: Jenn-Tsair Tsai, Taoyuan Hsien, Taiwan

[73] Assignee: Mustek Systems, Inc., Hsinchu, Taiwan

[21] Appl. No.: 08/916,943

[22] Filed: Aug. 25, 1997

[30] Foreign Application Priority Data

Apr. 9, 1997 [TW] Taiwan .................................. 86205515

[51] Int. Cl.⁶ ...................................................... H04N 1/04
[52] U.S. Cl. .......................................... 358/497; 358/474
[58] Field of Search .................................... 358/496, 497, 358/498; 399/206, 211

[56] References Cited

U.S. PATENT DOCUMENTS

| | | | |
|---|---|---|---|
| 5,504,586 | 4/1996 | Garcia et al. | 358/400 |
| 5,621,544 | 4/1997 | Ogura et al. | 358/494 |
| 5,734,483 | 3/1998 | Itoh | 358/496 |
| 5,781,313 | 7/1998 | Nose et al. | 358/497 |
| 5,801,851 | 9/1998 | Sheng | 358/497 |
| 5,831,749 | 11/1998 | Tseng et al. | 358/474 |
| 5,900,951 | 5/1999 | Tsai | 358/497 |

*Primary Examiner*—Edward L. Coles
*Assistant Examiner*—Derrick Fields
*Attorney, Agent, or Firm*—Sughrue, Mion, Zinn, Macpeak & Seas, PLLC

[57] ABSTRACT

A transmission mechanism for a contact-type image scanner is provided to reduce the height of a contact-type image scanner. The transmission mechanism mainly includes a Contact-Type Image Sensor (CIS) module with two bracket arms disposed beneath the sheet table of a housing, said CIS module having two bracket arms, a pair of shafts parallel to each other and engaged to the arms of the CIS module for supporting said CIS module to contact tightly with the bottom surface of said sheet table, two sets of pulleys each set located at the ends of the shafts, conveying device surrounding the pulleys in a shape of a twisted closed loop, and a driving device connected to one of the pulleys for rotating the conveying device to reciprocally drive the CIS module along the sheet table to and forth.

10 Claims, 2 Drawing Sheets

TRANSMISSION MECHANISM FOR A CONTACT-TYPE IMAGE SCANNER

BACKGROUND OF THE INVENTION

A. Field of the Invention

The present invention relates to a Contact-type Image Sensor (CIS) flatbed scanner, especially to a CIS scanner having a conveying device of a shape of a twisted closed loop for driving the Contact-type Image Sensor module (CIS module) in balance while still capable of keeping an original sheet within the scene depth of the CIS module.

B. Description of the Prior Art

A CIS scanner is a flatbed scanner that uses a CIS contact sensor for converting image signals into electric signals. A CIS contact sensor is a compact module which mainly includes light sources, mirrors, and a photoelectric converting device. The application of CIS module in a flatbed scanner has several advantages. For instance, it can simplify the inner structure of a scanner, reduce the size of a scanner, and make the scanner more easy to assemble and maintain.

Nevertheless, this approach did not prevail because of several difficulties in the conveying structure of the CIS scanner and the restrictions of its scene depth. The CIS module is in bar-like shape. A conventional conveying device drags the CIS module from one side because it only uses one driven motor. If the CIS module is driven by a conventional driving device from one of its bracket arm, the CIS module will easily become unbalanced while being dragged along the sheet table. If we want to use the conventional conveying device to drag the CIS module from both of its bracket arms, then it may needs two driving motors. That will inevitably increase the manufacture cost. In addition to these problems, the main reason for why the CIS scanner is not popular is because the scene depth of the CIS module is only about 0.3 mm. It is difficult for a conventional CIS scanner to assure a document sheet in focus while the CIS module being dragged along the sheet table.

SUMMARY OF THE INVENTION

Accordingly, it is an object of the present invention to provide a new transmission mechanism for a CIS scanner which can keep the CIS module in balance while the CIS module being dragged along the sheet table.

It is another object of the present invention to provide a CIS scanner which can control the document sheet to stay in focus, thereby improving the picture quality of images.

Preferred embodiment of the present invention preferably includes a conveying device having a shape of a twisted closed loop for dragging the CIS module and keeping it in balance while being dragged along a sheet table. The conveying device is driven by a single driving motor. To solve the scene depth problem, the invention uses rigid body and elastic elements to control the sheet in focus. The CIS module is mounted on a pair of shafts which rest on a pair of bracket bearings. At each bracket bearing, there is a rigid body interposed between the sheet table and the shaft for leaving a space between the CIS module and the sheet table. Inside each bracket bearing, there is an elastic element under the shaft for uplifting the shaft to) press the rigid body firmly onto the bottom surface of the sheet table. Consequently, the CIS module can move smoothly on the shafts and a document sheet can remain in focus, thereby improving the picture quality of images.

BRIEF DESCRIPTION OF THE DRAWING

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
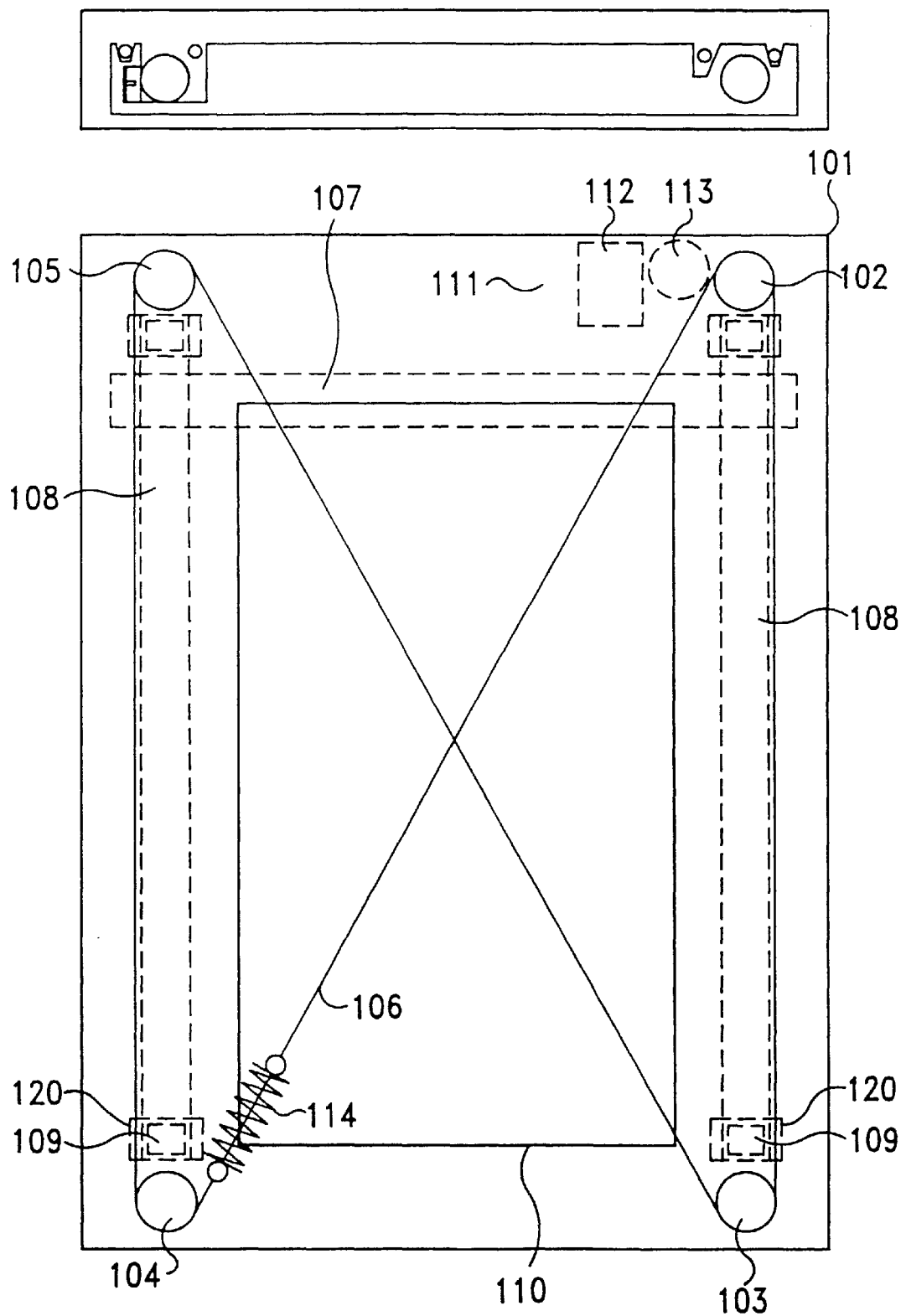
FIG. 1 is a perspective bottom view and side view schematically showing the structure of the preferred embodiment of the invention.

As to the unbalance problem caused by dragging the CIS module from one side, the invention intends to improve the structure of the conveying device by pulling the CIS module from both of its bracket arms without having to add another driving motor. FIG. 1 is a perspective bottom view and side view of the invention which illustrates the structure of the new conveying device. Refer to FIG. 1, from the bottom view we can see that the conveying device consists of a conveying belt 106 and four pulleys 102, 103, 104, 105 each locating at the corner of the housing 101 The conveying belt 106 is a steel wire rope or a timing belt which surrounds the pulleys 102, 103, 104, 105 and crosses over the bottom of the CIS module 107. The conveying belt 106 connects to the CIS module 107 from both sides for dragging the CIS module 107 along the sheet table and keeping it in balance. The conveying belt 106 is tighten by an elastic element 114, such as a spring. The function of the elastic element 114 is to prevent the conveying belt 106 from getting loose. The conveying belt 106 will stay in normal shape as long as the elasticity of the elastic element 114 is larger than the tension of the conveying belt 106.

The CIS module 107 is mounted on a pair of shafts 108. Each shaft 108 is resting on a pair of bracket bearings 109. At each of the bracket bearing 109, there is a rigid body 120 interposed between the shaft 108 and the sheet table 110 for leaving a space between the CIS module and the sheet table 110. The height of the rigid body 120 determines the distance between the CIS module 107 and the sheet table 110. Adjusting the distance therebetween can be achieved by altering the height of the rigid body 120. Inside each bracket bearing 109, there is an elastic element (not shown) under the shaft 108, such as a spring coil or a spacer for lifting the shafts 108 up to press the rigid body 120 firmly onto the bottom surface of the sheet table 101. The rigid body 120 and the elastic element (not shown) help to keep a stable distance between the sheet table 101 and the CIS module 107. Consequently, the CIS module 107 can be dragged along the shaft 108 smoothly because it is dragged from both sides. The document sheet can surely stay in focus because the distance between the CIS module 107 and the sheet table 110 is controlled by the rigid body 120 and the elastic element (now shown).

The conveying belt 106 is driven by the pulleys according to the following mechanism. The pulley 102 is coupled to driving device 111. The driving device 111 consists of a motor 112 and a pulley set 113. When the driving device 111 is enabled, it drives the pulley set 113 which further drives the pulley 102. When the pulley 102 rotates in clock-wise direction, it drives the right segment of the conveying belt 106 towards pulley 103. At the same time, because the conveying belt 106 crosses at the center and is a loop, it will cause the left segment of the conveying belt 106 to move towards pulley 104 Thus, the CIS module 107 will be dragged towards the opposite end of the sheet table 110 from both sides. This mechanism repeats until the process of scanning terminates.

Figure 2A:
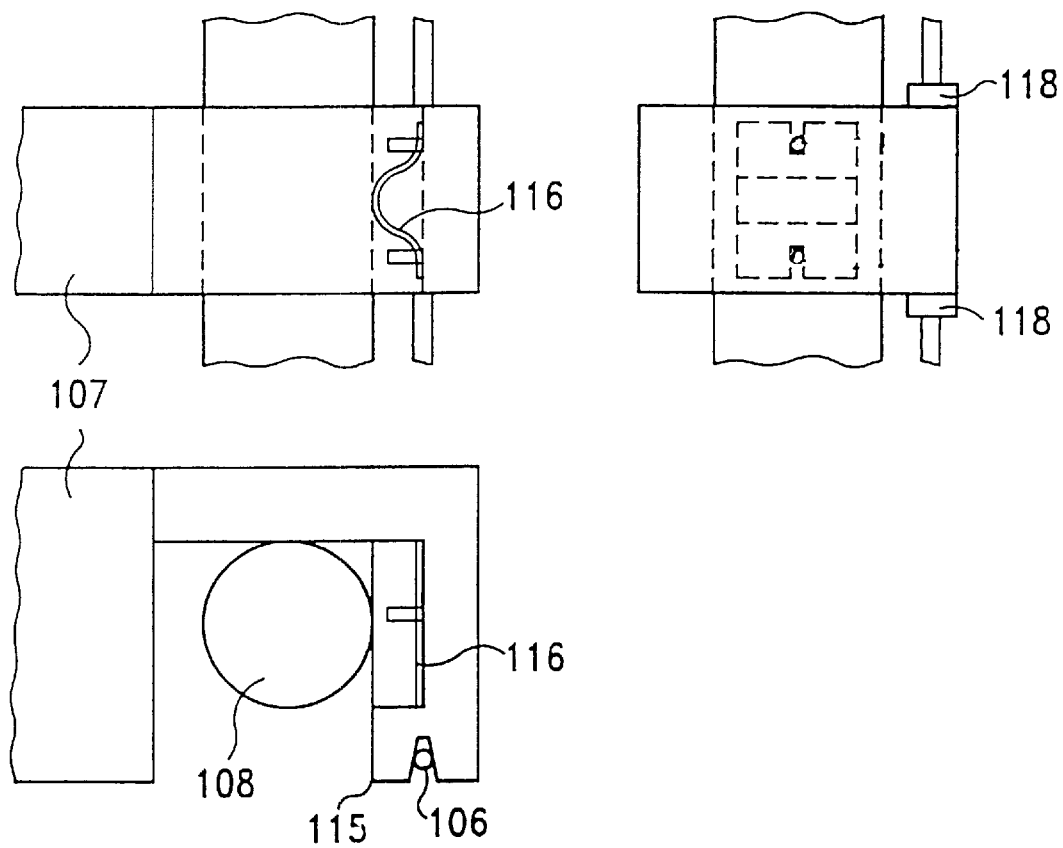
FIG. 2A is a perspective side view and top view schematically showing one side of the CIS module according to the preferred embodiment of the invention.
Figure 2B:
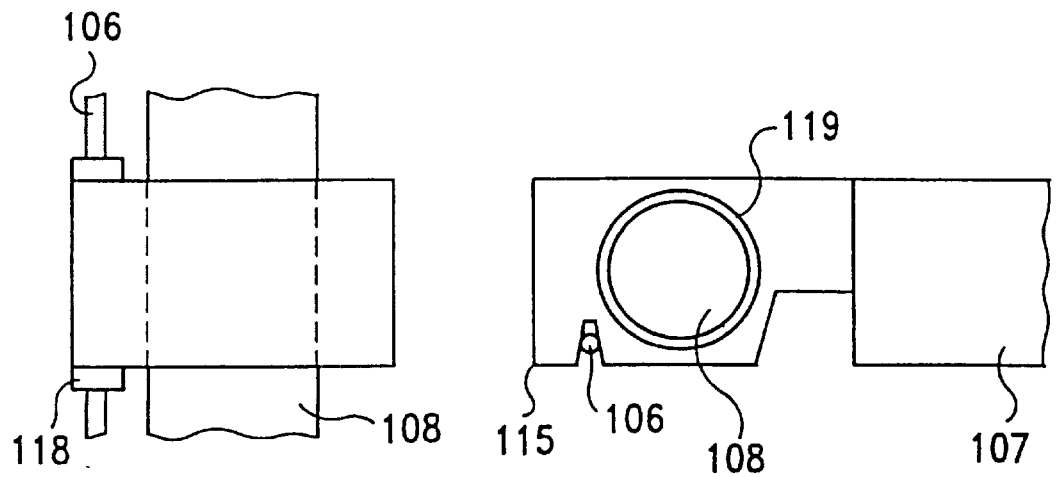
FIG. 2B is a perspective side view and top view schematically showing the other side of the CIS module according to the preferred embodiment of the invention.

FIGS. 2A and 2B show the structure where the conveying belt 106 connects to the CIS module 107. Refer to FIG. 2A which is a side view showing the shaft bracket of the CIS module 107. The shaft bracket of the CIS module 107 rests on shaft 108. The conveying belt 106 connects to the U groove 115 on the shaft bracket of the CIS module 107 and is tied up with a knot 118. On inner side of the shaft bracket, there is a spring leaf 116 attached thereon for keep the CIS module 107 in balance while moving on the shafts 108.

FIG. 2B is also a side view showing the other bracket arm of the CIS module 107. The other bracket arm of the CIS module is a shaft busing which contains shaft 108 and a bushing 119 for supporting and guiding the CIS module 107 sliding on the shafts 108. The conveying belt 106 connects to the U groove 115 of the shaft bushing and is also tied up with a knot 118.

To sum up, the conveying device of the preferred embodiment of the invention can keep the CIS module in balance while being pulled on the shafts along the sheet table. With the elastic elements and the rigid body, the distance between the CIS module and a document sheet remains stable, thereby keeping the document sheet in locus.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A transmission mechanism for a contact-type image scanner, wherein said contact-type image scanner having at least a housing, and a sheet table on top of said housing for supporting a document sheet, comprising:

a Contact-Type Image Sensor (CIS) module disposed beneath said sheet table, said CIS module having two bracket arms;

a pair of parallel shafts each rested on a pair of bracket bearings and each engaged to said two arms of said CIS module for supporting said CIS module to contact tightly with the bottom surface of said sheet table;

two sets of pulleys each set located at the ends of said pair of shafts and on the same horizontal plane;

conveying means surrounding said two sets of pulleys in a shape of a twisted closed loop, said twisted closed loop having two parallel parts at the longitudinal sides of said housing and said two parallel parts affixed to said bracket arms of said CIS module; and driving means connected to one pulley of said two sets of pulleys for rotating said conveying means to reciprocally drive said CIS module along said sheet table from a first direction to a second direction.

2. The transmission mechanism as claimed in claim 1, further comprising:

a plurality of rigid body each interposed between each of said pair of bracket bearings and said sheet table for determining the distance between said sheet table and said CIS module.

3. The transmission mechanism as claimed in claim 1, wherein said conveying means is a steel wire rope.

4. The transmission mechanism as claimed in claim 1, wherein said conveying means is a timing belt.

5. The transmission mechanism as claimed in claim 1, wherein said CIS module having a bracket arm for a shaft bushing and the other bracket arm for a shaft bracket.

6. The transmission mechanism as claimed in claim 1, wherein said driving means comprises:

a master pulley set connected to one pulley of said two sets of pulleys; and a motor connected to said master pulley set.

7. A transmission mechanism for a contact-type image scanner, wherein said contact-type image scanner having at least a housing, and a sheet table on top of said housing for supporting a document sheet, comprising:

a Contact-Type Image Sensor (CIS) module disposed beneath said sheet table, said CIS module having two bracket arms;

a pair of parallel shafts each rested on a pair of bracket bearings and each engaged to said two arms of said CIS module for supporting said CIS module to contact tightly with the bottom surface of said sheet table;

a plurality of rigid body each interposed between each of said pair of bracket bearings and said sheet table for determining the distance between said sheet table and said CIS module;

two sets of pulleys each set located at the ends of said pair of shafts and on the same horizontal plane;

conveying means surrounding said two sets of pulleys in a shape of a twisted closed loop, said twisted closed loop having two parallel parts at the longitudinal sides of said housing and said two parallel parts affixed to said bracket arms of said CIS module;

a master pulley set connected to one pulley of said two sets of pulleys; and a motor connected to said master pulley set for indirectly rotating said conveying means to reciprocally drive said CIS module along said sheet table from a first direction to a second direction.

8. The transmission mechanism as claimed in claim 7, wherein said conveying means is a steel wire rope.

9. The transmission mechanism as claimed in claim 7, wherein said conveying means is a timing belt.

10. The transmission mechanism as claimed in claim 7, wherein said CIS module having a bracket arm for a shaft bushing and the other bracket arm for a shaft bracket.

* * * * *